United States Patent [19]
Golin

[11] Patent Number: 5,134,478
[45] Date of Patent: Jul. 28, 1992

[54] METHOD AND APPARATUS FOR COMPRESSING AND DECOMPRESSING A DIGITAL VIDEO SIGNAL USING PREDICTED AND ERROR IMAGES

[75] Inventor: Stuart J. Golin, East Windsor, N.J.
[73] Assignee: Intel Corporation, Santa Clara, Calif.
[21] Appl. No.: 704,945
[22] Filed: May 23, 1991

Related U.S. Application Data

[63] Continuation-in-part of Ser. No. 657,708, Feb. 19, 1991, which is a continuation-in-part of Ser. No. 408,085, Sep. 15, 1989, which is a continuation of Ser. No. 104,457, Oct. 5, 1987, Pat. No. 4,868,653.

[51] Int. Cl.[5] ............................................. H04N 7/13
[52] U.S. Cl. .................................. 358/136; 358/105; 358/135
[58] Field of Search ................ 358/135, 138, 136, 105

[56] References Cited

U.S. PATENT DOCUMENTS 4,849,810  7/1989  Ericsson ........................ 358/135 X
4,853,779  8/1989  Hammer .......................... 358/133

Primary Examiner—Victor R. Kostak
Attorney, Agent, or Firm—Carl L. Silverman; William H. Murray; Daniel H. Golub

[57] ABSTRACT

In a method of encoding a sequence of frames of a full color digital motion video signal, the initial frame of the sequence is selected for encoding at multiple levels of resolution. The initial frame becomes a previous target image and a previous reconstructed image is formed by storing a reconstructed image. After processing the initial frame, each subsequent frame of the sequence of frames is then selected as the target image. Displacement vectors, representing the magnitude and displacement between regions in the target image being processed and corresponding regions in the previous target image are provided. Each displacement vector is applied to a corresponding region in the previous reconstructed image to form a predicted image. The displacement vectors are encoded using a binary tree technique with off-center splits. An error image, which is formed by subtracting pixel values in the predicted image from corresponding pixel values in the target image is encoded at multiple levels of resolution using a binary tree technique with off-center splits. A new previous target image is formed by storing the target image being processed in place of the previous target image. A new previous reconstructed image is formed by storing a new reconstructed image in place of the previous reconstructed image. The method is repeated for each of the remaining subsequent images in the sequence of frames. In one embodiment, frames are encoded and decoded in and out of display order sequence for subsequent displaying in the correct display order sequence.

24 Claims, 6 Drawing Sheets

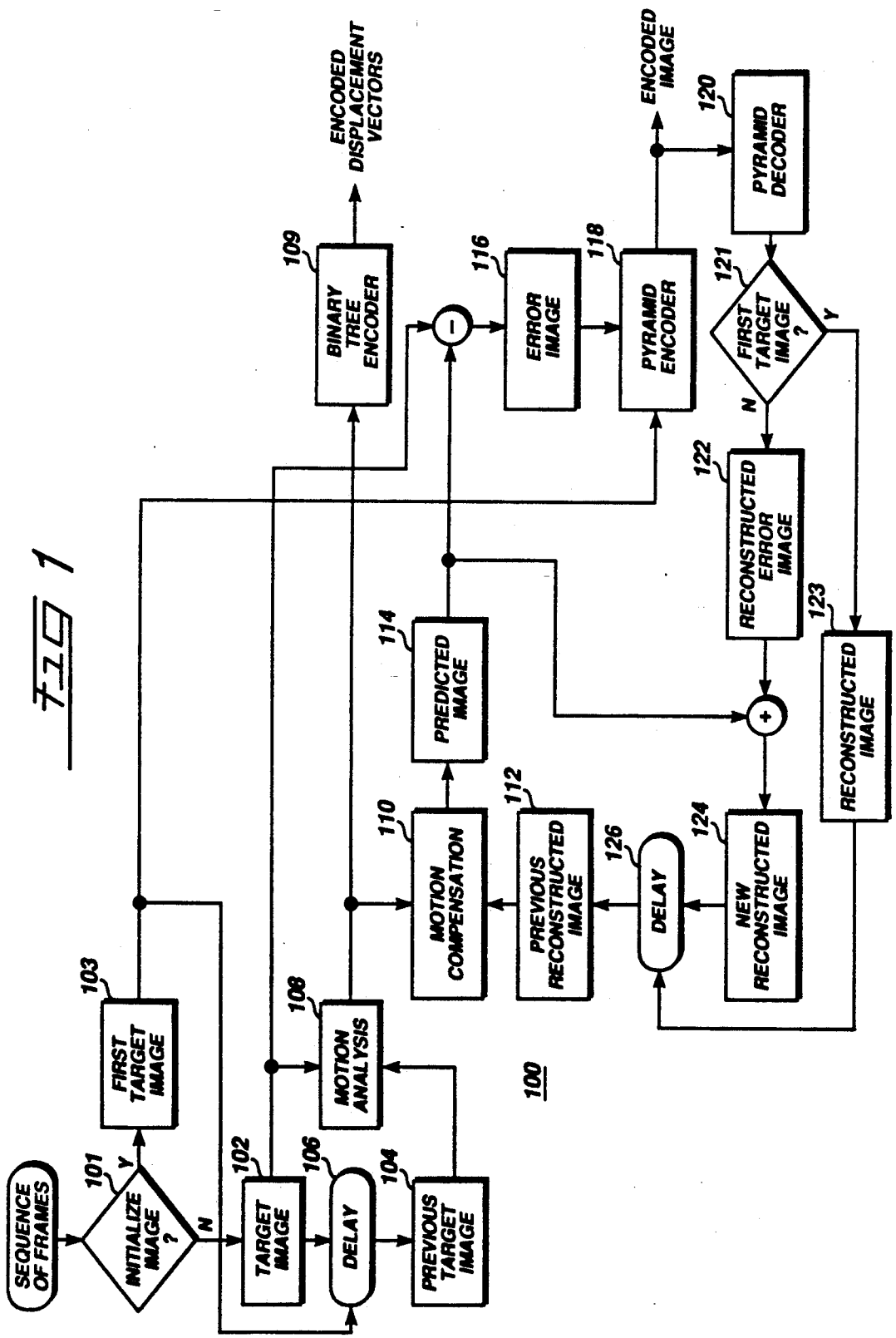

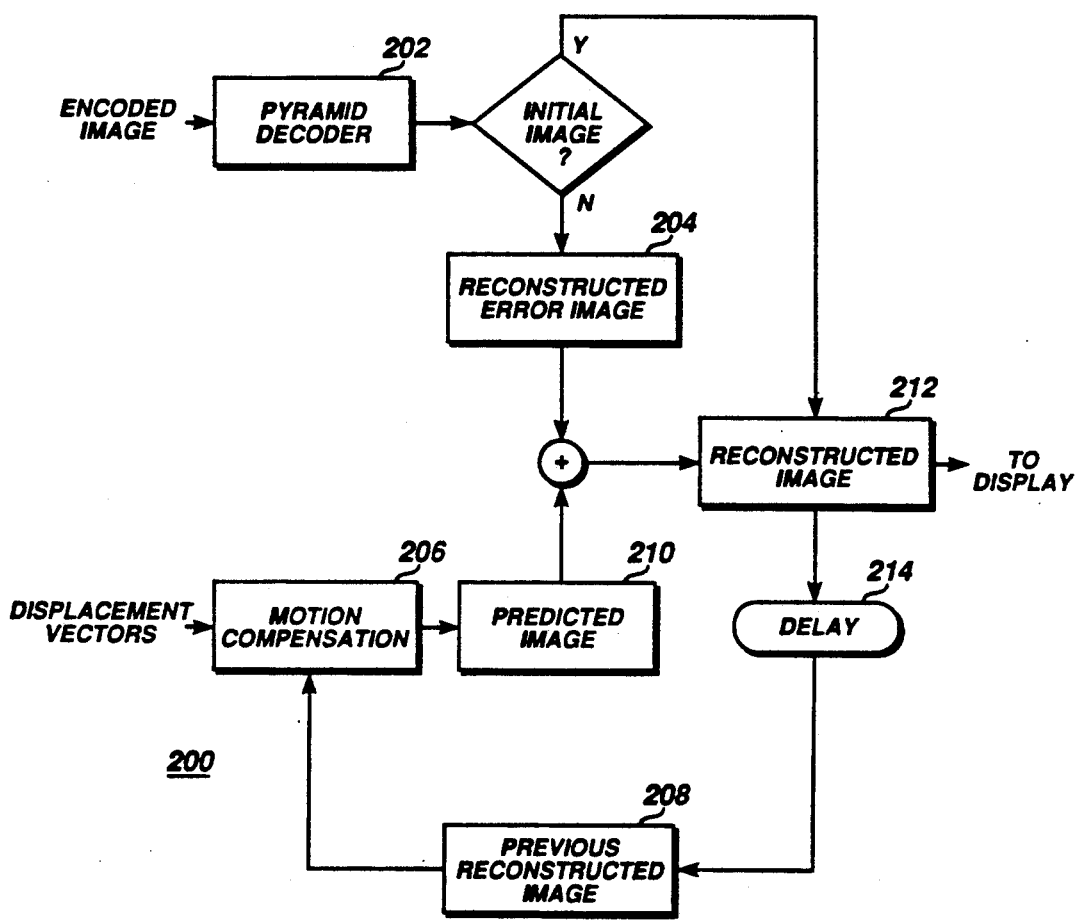

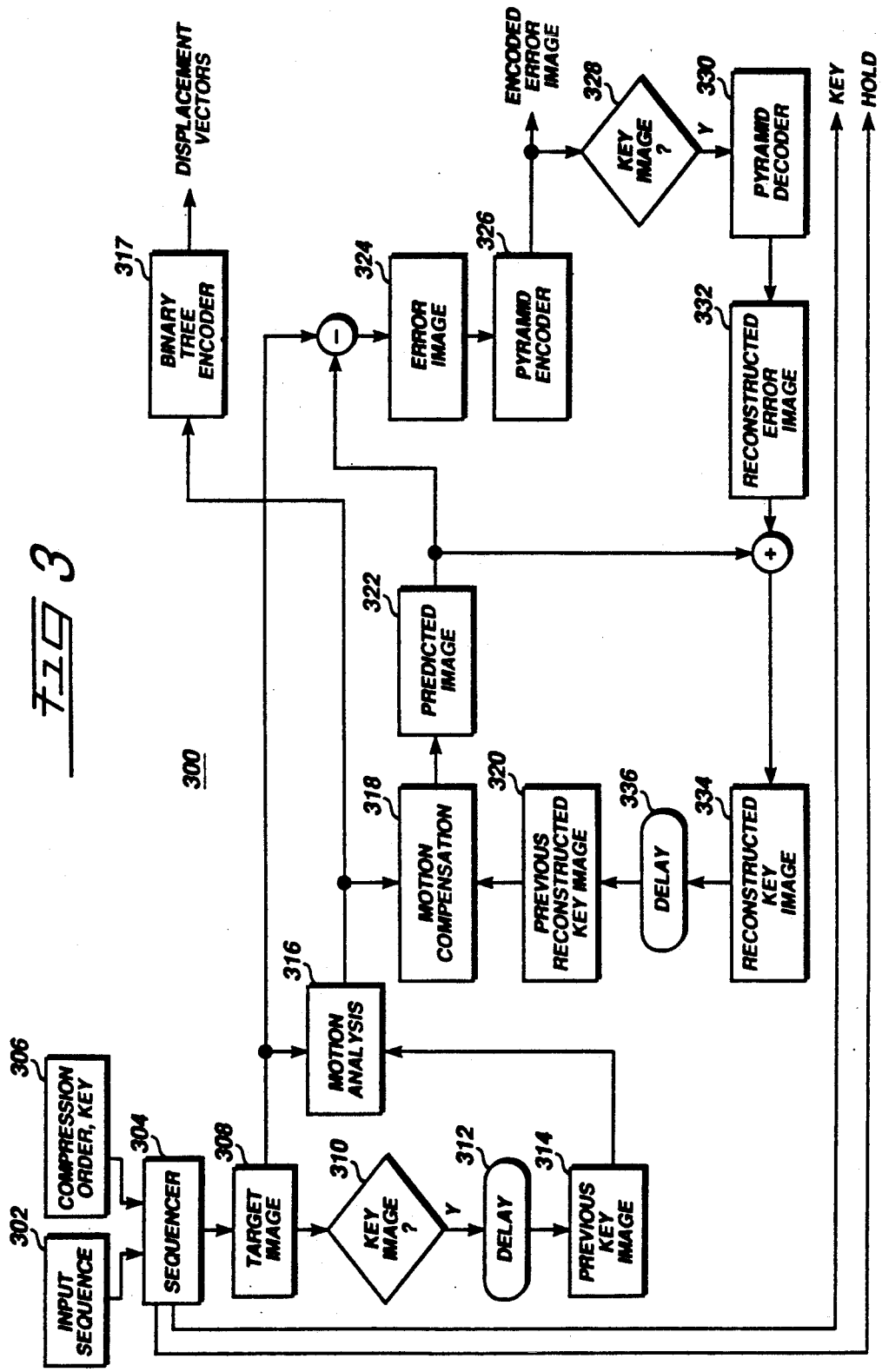

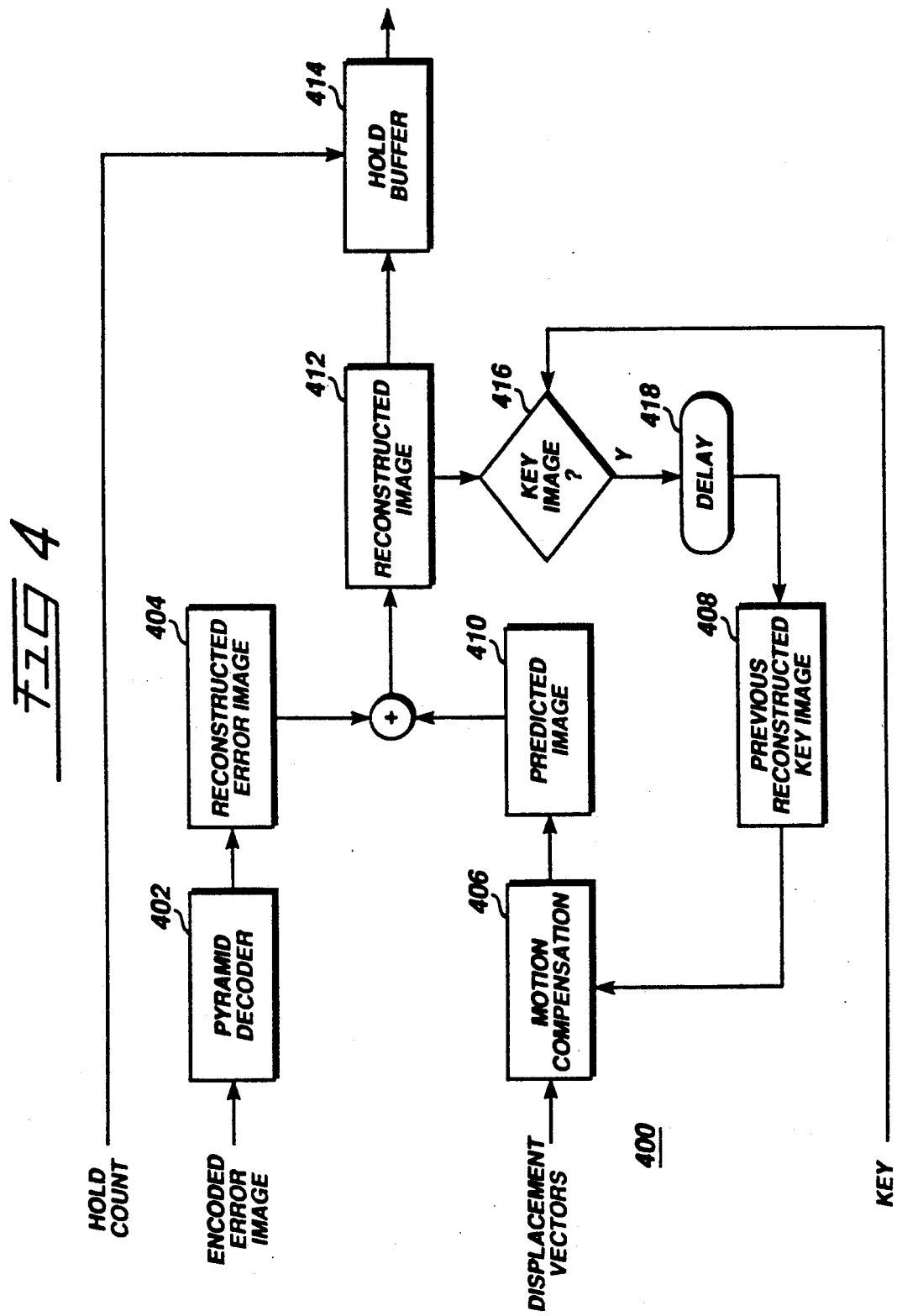

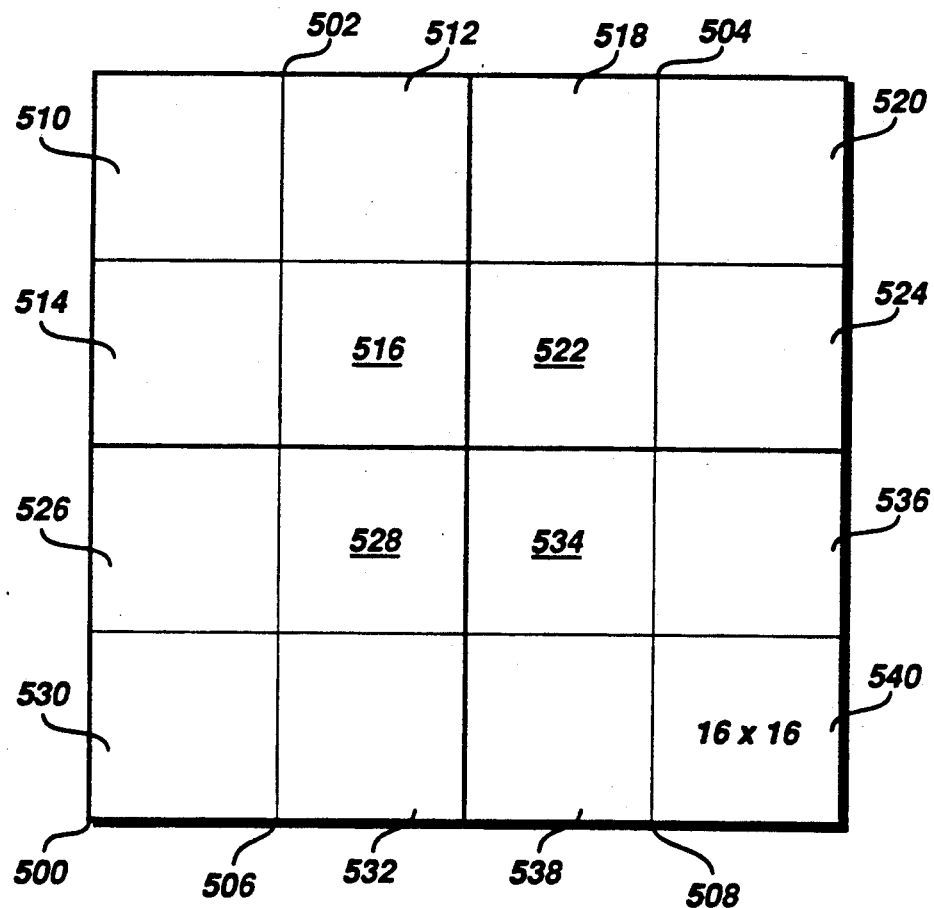

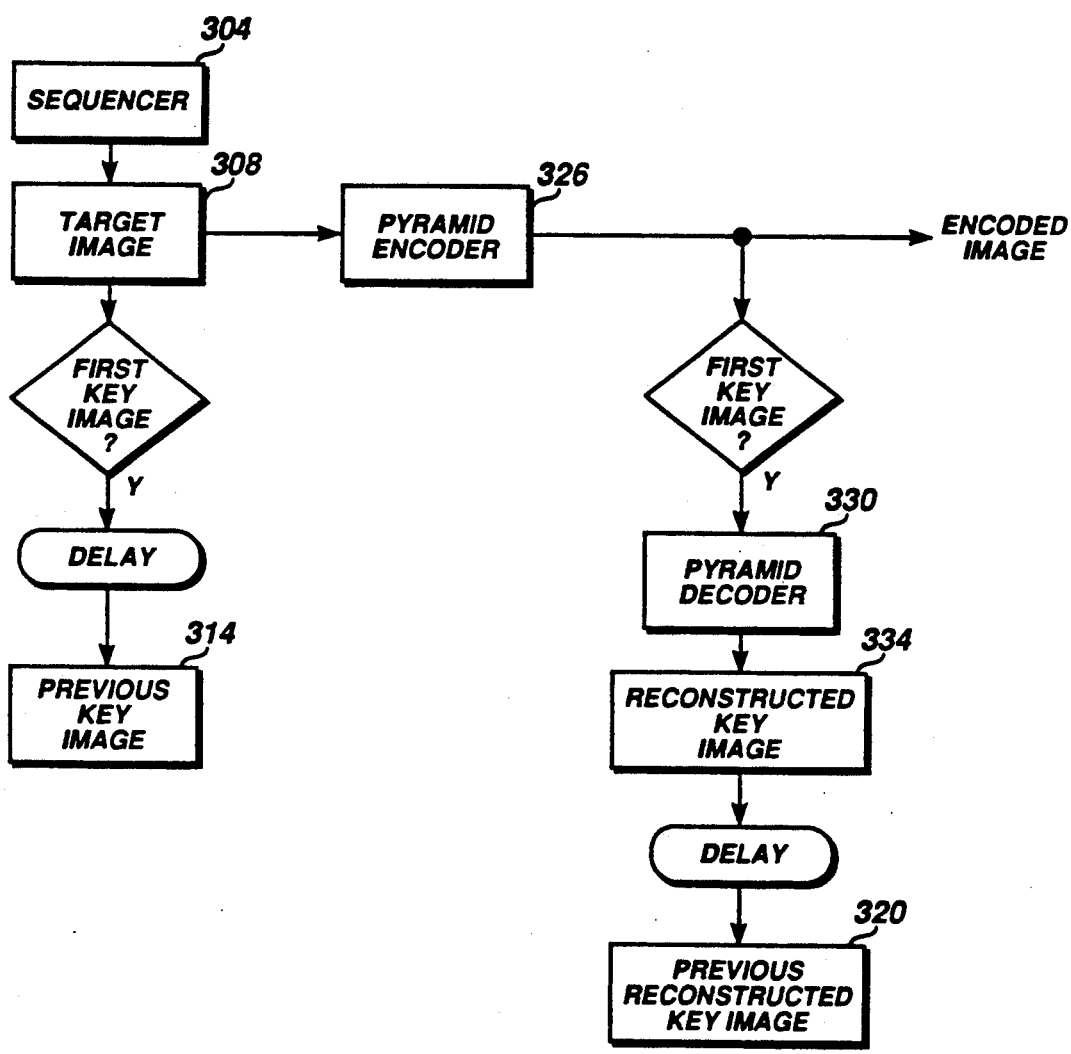

METHOD AND APPARATUS FOR COMPRESSING AND DECOMPRESSING A DIGITAL VIDEO SIGNAL USING PREDICTED AND ERROR IMAGES

CROSS REFERENCE TO RELATED APPLICATIONS

This application is a Continuation-In-Part of co-pending U.S. Pat. Application Ser. No. 07/657,708, filed Feb. 19, 1991; which is a Continuation-In-Part of co-pending U.S. Pat. Application Ser. No. 07/408,085, filed Sept. 15, 1989; which is a Continuation of U.S. Patent Application Ser. No. 07/104,457, filed Oct. 5, 1987, now U.S. Pat. No. 4,868,653.

FIELD OF THE INVENTION

This invention relates to video signal processing generally and particularly to systems and methods for providing and decoding a compressed digital video signal representative of a full motion color video signal.

BACKGROUND OF THE INVENTION

The system described in the grandparent application Ser. No. 07/408,085 is directed to meeting the need for providing a compressed digital video signal representative of a full motion color video signal, which is suitable for recording or transmission using relatively narrow band media; and for decoding such a compressed signal to enable display of full motion video images at normal video frame rates. Although that system is effective for encoding and decoding most images, it was discovered that the system had some difficulty with certain images such as, for example, images containing a large amount of fast and/or uncoordinated motion; that is motion which does not occur substantially uniformly in the same direction over relatively large portions of the image.

It was found that such images were difficult to encode since the linear fill technique employed by the system was too gross an encoding method to be used with images containing substantial amounts of uncoordinated moving detail. With such images, it is desirable to encode each individual pixel; however, the system disclosed in the grandparent application is often allowed only an average of one half bit for encoding each pixel. Therefore, the parent application, Ser. No. 07/408,085, added a feature to the system of the grandparent application which enables effective compression and decompression of selected images such as those having a substantial amount of moving detail.

In accordance with that feature, at least one selected frame of a sequence of frames of a digital video signal is encoded at multiple levels of resolution. However, it was found that since the selected image was treated as a still image, there were not enough bits available to satisfactorily encode the selected image at full resolution as well as lower levels of resolution. Accordingly, although the display of the entire sequence of images, including the selected images, was acceptable, it is still desirable to improve the image quality of all of the images in the entire sequence of images of the full motion color video signal. Therefore, it is desirable to add a feature to the system of the parent application which will enable effective compression and decompression of a full motion video signal, while enhancing the quality of all of the images in the displayed image sequences.

The system of the grandparent application processes each of the images of the sequence of images in sequential order as they occur within the sequence. Accordingly, each image is compressed and decompressed based upon the content of the previous image. Although this scheme of sequential processing enables the satisfactory compression and decompression of a digital video signal representative of a full motion color video signal, it was found that this scheme is prone to accumulating errors from image to image. That is, an error in compressing and/or decompressing an image may be propagated to subsequent images. Therefore, it is desirable to add a feature to that system to enhance the quality of the displayed images by reducing the accumulation of errors from image to image in the sequence of images during compression.

SUMMARY OF THE INVENTION

The present invention is directed to meeting the need for a compression system for providing a compressed digital video signal representative of a full motion color video signal, which is suitable for recording or transmission using relatively narrow-band media; and for a decompression system for decompressing the signal at speeds at least equal to conventional video frame rates.

In accordance with an aspect of the invention, a target image in a sequence of images is divided into a plurality of blocks of pixels, each block comprising a predetermined number of pixels. A target region comprising at least one pixel block, is selected from the target image. The image preceding the target image is analyzed in order to locate a region of the preceding image which most closely matches the target region of the target image. If no motion has occurred, the preceding and target regions will have the same coordinates within the image frame. If motion has occurred, the preceding region will be offset or translated relative to the target region by an amount which is represented by a displacement vector. This displacement vector is encoded for subsequent use by decoder in decoding the compressed digital video signal.

In accordance with another aspect of the invention, a predicted image is formed by applying the displacement vector to a previous reconstructed image. An error image is formed by subtracting pixel values of the predicted image from corresponding pixel values of the target image. The error image is then encoded at multiple levels of resolution. The encoded multiple levels of resolution are subsequently used by the decoder to form a reconstructed image for display.

In accordance with a further aspect of the present invention, the images of the sequence of images may be processed in a non-sequential order, in order to minimize errors which accumulate from image to image. Furthermore, there is flexibility in choosing the image from which to form a predicted image. For example, anomalous images can be excluded from the prediction process.

BRIEF DESCRIPTION OF THE DRAWINGS

The foregoing and further features are shown in the accompanying drawing in which:

FIG. 1 is a block diagram of a preferred embodiment of a method of compressing a full motion color video digital signal in accordance with the present invention.

FIG. 2 is a block diagram of a preferred embodiment of a method of decompressing the compressed full motion color video digital signal in accordance with the present invention.

FIG. 3 is a block diagram of a preferred embodiment of a method of compressing images subsequent to a first key image of a sequence of images of a full motion color video digital signal in an out-of-sequence order in accordance with the present invention.

FIG. 4 is a block diagram of a preferred embodiment of a method of decompressing images subsequent to a first key image of a sequence of images in an out of sequence order and presenting them for display in the proper sequence in accordance with the present invention.

FIG. 5 depicts an exemplary array of blocks of pixels for which starting displacement vectors are determined.

FIG. 6 is a block diagram of a preferred embodiment of a method of compressing all images up to and including the first key image of a sequence of images of a full motion color video digital signal in accordance with the present invention.

DETAILED DESCRIPTION OF THE PREFERRED EMBODIMENT

Referring now to FIG. 1, there is shown a block diagram of a preferred embodiment of a method, generally designated 100, of encoding a full motion color video digital signal in accordance with the present invention. The method comprises the steps of selecting 101 a target image 102 from a sequence of frames of a digital motion video signal. The target image 102 is an image, other than the first image of the sequence of images, which is being compressed and encoded. The first image of the sequence is defined, for purposes of this detailed description, as a first target image 103 which is treated differently as will be subsequently described. Since the target image 102 is not the first image in the sequence, a previous target image 104 is provided. In one aspect of the preferred embodiment, the previous target image 104 i-s the image which immediately precedes the target image 102 in the sequence of images. In the block diagram of FIG. 1, this is represented by the delay 106. This delay is accomplished by storing the target image 102 in a first memory device for a predetermined period of time, preferably one frame period, whereby the target image becomes the previous target image for purposes of motion analysis 108. In the case of a full motion color video signal which is displayed at the rate of 30 frames per second, the delay 106 represents a delay of 1/30th of a second.

In the motion analysis 108, the target image 102 and the previous target image 104 are each resolved into at least one lower level of resolution. In the preferred embodiment the target image 102 and the previous target image 104 are each resolved into four lower levels of resolution. Each level of resolution, except the lowest, is divided into a plurality of blocks of pixels, each block comprising a predetermined number (m ×n) of pixels. Each block is preferably a square block of 256 pixels where m=16 and n=16. In the preferred embodiment, the lowest resolution image for both the target image and the previous target image each comprises an array of approximately 16×16 pixels. The displacement vector is determined for this lowest level of resolution by determining the direction and magnitude of motion of the lowest resolution level of the target image 102 with respect to the lowest resolution level of the previous target image 104. If no motion has occurred, the previous and present target images will have the same coordinates within the image frame. If motion has occurred, the previous target image will be offset or translated relative to the present target image by an amount which is represented by a displacement vector. Except for the fact that it is done at multiple levels of resolution, the determination of the displacement vectors within each level of resolution is performed substantially in accordance with the procedure set forth in the parent application Ser. No. 07/657,708, the full text of which has been incorporated into the present application by reference.

The lowest level of resolution is expanded to the next higher level of resolution which, in the preferred embodiment, comprises a 32×32 array of pixels. This next higher level of resolution is divided into four 16×16 blocks which are analyzed and their displacement vectors found in accordance with the procedures for determining displacement vectors as set forth in the parent application. The starting point in the search for the best displacement vectors is based on the displacement vectors determined with respect to the next lower level of resolution.

Within each level of resolution, except the lowest level, each 32×32 block is the result of the expansion of a 16=16 block in the next lower level of resolution. Each of these 32×32 blocks is divided into four 16×16 blocks. The starting displacement vector for each of these 16×16 blocks is the one that gives the best match among the four nearest 32×32 blocks. For example, referring to FIG. 5 consider an overall square array 500 of four included 32×32 blocks 502, 504, 506 and 508 each of which comprises four 16×16 blocks 510 through 540. To find the displacement vector for the 16×16 pixel block 510 in the upper left hand corner of the included 32×32 block 502 located in the upper left hand corner of the overall array 500, a search is made of only the included 32×32 array 502 in the upper left hand corner of the overall array of the corresponding resolution level of the previous target image in order to find an 16=16 region which most closely matches the upper left hand 16×16 block. This is because it is considered that the other included 32×32 arrays in the overall array are too remote to contain a matching 16×16 pixel block.

When searching the corresponding resolution level of the previous target image for a block most closely matching the 16×16 pixel block 512 in the upper right hand corner of the included 32×32 array 502 in the upper left hand corner of the overall array, a scan is made only of the included 32×32 arrays in the upper left corner, array 502, and the upper right hand corner, array 504, of the overall array 500 in the corresponding resolution level of the previous target image. This scan is made to find a good starting point for the search since it is considered most likely that a match will be found in either one of these included arrays, and less likely that a match will be found in the more remote lower left hand and lower right hand included 32×32 arrays.

When searching the corresponding resolution level of the previous target image for a block most closely matching the 16×16 block 516 in the lower right hand corner of the included 32×32 array 502 in the upper left hand corner of the overall array 500, a scan is made of each of the four included 32×32 arrays 502, 504, 506 and 508 of the overall array 500 in the corresponding resolution level of the previous image. Once again, this scan is made to find a good starting point for the search since it is considered likely that a match will be found in one of these included 32×32 arrays since 16×16 array 516 is included in 32×32 array 502; and 32×32 arrays 504, 506 and 508 border on the 16×16 array 516. This technique is utilized in order to reduce the amount of searching required to find corresponding 16×16 pixel blocks in calculating the displacement vectors for these pixel blocks.

The above analysis continues until the displacement vectors for each of the 16×16 pixel blocks in the full resolution image are determined. Each of these 16×16 blocks are then divided into four 8×8 pixel blocks. The final displacement vector for each of these 8×8 blocks is the one that gives the best match among the four nearest 16×16 blocks. These displacement vectors are then encoded 109 for subsequent use by a decoder in decoding the compressed video signal. At various places, the set of displacement vectors is "smoothed" to reduce the number of displacement vectors that must be encoded. Thus, for example, if the displacement vector of a block is near that of its neighbors, it will be changed to be the same if the match is not made much worse.

An off-center splitting technique is used for dividing the displacement vectors into homogeneous and non-homogeneous regions. A "homogeneous region" is defined as an area of blocks all of whose displacement vectors are quantized to the same value. A pair of blocks implies two blocks that are horizontally or vertically adjacent, and that border the candidate split.

The object of off-center splitting is to encode as many displacement vectors as a unit as possible, while minimizing the number of splits. This is accomplished by guiding the splitting to encompass large homogeneous regions. In other words, the object is to describe the displacement vectors having the same values with the minimal number of bits. The present technique considers only those blocks that border the candidate split. It considers all possible splits that coincide with block boundaries except for those that split homogeneous areas, and calculates a value for each. The split with the highest value is chosen. The value of the split is determined in the same manner as that determined for off-center splitting of pixel blocks describe later in this detailed description. The binary tree technique, described in the parent application, is then used to efficiently encode the displacement vectors. It should be noted that although the binary tree is used to encode the displacement vectors in the present invention, it is not used in the analysis as set forth in the grandparent application.

The displacement vectors resulting from the motion analysis 108 are also used in performing motion compensation 110. In motion compensation 110, the displacement vectors from the motion analysis 108 are applied to a previous reconstructed image 112 to form a predicted image 114. Each block of the predicted image 114 is initially taken from the previous reconstructed image 112. The displacement vectors which are determined as a result of the motion analysis 108 are applied to the locations of their respective pixel blocks as they existed in the previous reconstructed image to determine the locations of the image blocks in the predicted image 114. If the value of a displacement vector is not an integer number of pixels, then the pixel values for that vector are calculated by interpolation, preferably linear interpolation. The pixel values of the predicted image 114 are subtracted from corresponding pixel values in the target image 102 to form an error image 116. At least one level of resolution of the error image 116 is selected and encoded by a pyramid encoder 118. The pyramid encoder 118 is capable of selecting and encoding the full resolution level only; the full resolution level and at least one lower level of resolution; or at least one level of resolution lower than the full resolution level but not the full resolution level. Each selected level of resolution is encoded substantially in accordance with the method set forth in the parent application Ser. No. 07/657,708 which application is incorporated into this detailed description by reference as if fully set forth herein.

The principle difference is the use, in the present invention, of an off-center splitting technique for dividing the quantized correction image at each selected level of resolution into null and non-null regions. In the technique of the present invention, an "AREA" is defined as a rectangular region of blocks of pixels. The blocks may be null or non-null, where a non-null block of pixels is one that contains at least one pixel quantized to a non-zero value. A "homogenous area" is defined as an area that contains pixel blocks of only one type, null or non-null. A pair of pixel blocks implies two blocks that are horizontally or vertically adjacent, and that border the candidate split.

The object of off-center splitting is to put as many pixels as possible in null areas, while minimizing the number of splits. Stated differently, the object is to describe the locations of the null blocks with the minimal number of bits. In the process, it is permissible for a few null blocks to be described as non-null in order to achieve this objective. The present technique considers only those blocks that border the candidate split. As there is no value in splitting homogenous areas, the technique ignores splits that border only one kind of block. Otherwise, it considers all possible splits that coincide with block boundaries, and calculates a value for each. The split with the highest value is chosen.

The following statistics are calculated for each candidate split and are then used in determining the value of the candidate split. "SAME" is defined as the number of pairs of blocks of the same type on the same side of the split. It is desirable that this number be large. "DIFF" is defined as the number of pairs of blocks of the opposite type on opposite sides of the split. It is desirable that this number also be large. "BONUS" will be a "1" if all blocks on one side of the split are of the same type; and "2" if all blocks on the other side of the split are of the other type. When a split merits this bonus, it means that a homogenous area either has been created, or can be created with one more split. "NORM" is defined at the total number of blocks on one side of the split. This term eliminates the bias that would otherwise result from splitting the smaller dimension. "OFFCTR" is defined as the number of blocks separating this split from a centered split. If there are an odd number of blocks to be split, the choice of the center is arbitrary. Other things being equal, it is desired that this number be small.

Using the calculated values of the statistics defined above, the value "VALUE" of the candidate split is then: VALUE = (c0 * SAME + c1 * DIFF) / NORM + c2 * BONUS − c3 * OFFCTR where the c's are adjustable parameters. The target area is repeatedly split according to this technique until all areas are homogenous, or until some minimum size is reached. When there is minimum size, it may happen that two inhomogeneous areas result from a split. If such occurs, it is preferable that such areas be merged together. It should be noted that in the preferred embodiment this technique never looks ahead or backtracks, except for the merges mentioned above. Once a split is chosen for an area, it is preferably never reconsidered.

The encoded error image is subsequently used by a decoder in decoding the compressed digital video signal as will be subsequently described. The encoded error image is also decoded by a pyramid decoder 120 to form a reconstructed error image 122 as described in the parent patent application Ser. No. 07/657,708. The pixel values of the reconstructed error image 122 are added to the corresponding pixel values of the predicted image 114 to form a reconstructed image 124. After a delay 126 of one frame period, the reconstructed image 124 becomes the previous reconstructed image 112. In the preferred embodiment, this delay is accomplished by storing the reconstructed image 124 in a second memory device for one frame period.

As previously stated, the above description pertains to all target images 102 in the sequence of images except the first image. In the case of the first image of the sequence of images, the method comprises selecting 101 a first target image 103. The first target image 103 is encoded by the pyramid encoder 118 in accordance with the technique previously described with respect to encoding the error image 116. The encoded first target image is subsequently used by the decoder in decoding the compressed digital video signal. The encoded first target image is also decoded by the pyramid decoder 120 and since this is the decoded first target image 121, it forms a reconstructed image 123 which is stored in the second memory device to become the previous reconstructed image 112. The first target image 103 is also stored in the first memory device thereby becoming the previous target image 104. The first target image 103 remains as the previous target image 104 until it is replaced in the first memory device by the next previous target image which is a delayed 106 target image 102 as previously described. It should be noted at this point that from time to time it may be desirable to compress an image of the digital motion video signal as a still image. Such an image is preferably processed as if it were a first target image 103. Consequently, a first target image 103 can be either the first image in a sequence of images of the digital motion video signal or a selected image which is treated as a still image.

Referring now to FIG. 2, there is shown a block diagram of a preferred embodiment of a method, generally designated 200, of decoding the encoded full motion color video digital signal in accordance with the present invention. In accordance with the method 200, each selected encoded resolution level of the encoded error image is decoded by a pyramid decoder 202, as described in parent U.S. Pat. Application Ser. No. 07/657,708, to form a reconstructed error image 204. The encoded displacement vectors are decoded using the binary tree decoding technique described in the parent application. Motion compensation 206 is performed by applying the decoded displacement vectors to a previous reconstructed image 208 to form a predicted image 210. In the preferred embodiment, the predicted image 210 is formed in the same manner as previously described for forming the predicted image 114 during compression. The pixel values of the predicted image 210 are added to the corresponding pixel values of the reconstructed error image 204 to form a reconstructed image 212. The reconstructed image 212 is subsequently displayed as part of the sequence of images. The reconstructed image is also delayed 214 to form the previous reconstructed image 208 This delay is accomplished by storing the reconstructed image 212 in a memory device for a predetermined period of time, preferably one frame period.

In order to minimize the accumulation of errors from image to image in a sequence of images, the images are processed out-of-sequence in an alternate preferred embodiment of the present invention. For example, in a sequence of images comprising images 0, 1, 2, 3, 4, 5, 6, where image 0 is the initial image, the accumulation of errors might be minimized by processing the images in, for example, the out-of-order sequence 0, 1, 3, 2, 4, 6, and 5; where image 1 is based on image 0; image 3 is based on image 0; image 2 is based on image 3; image 4 is based on 3; image 6 is based on image 3; and image 5 is based on image 6. Since the images are encoded in the sequence 0, 1, 3, 2, 4, 6, 5, they must be decoded in the same sequence. However, the display order must still be the sequence 0, 1, 2, 3, 4, 5, 6.

In order to accomplish the out of sequence encoding and decoding, while displaying the images in the proper sequence, a key buffer is defined in memory. The key buffer will store a decoded key image. A key image is an image which is used as a previous image to which is added the motion compensation vector quantities to form a predicted image. The key images in the above sequence are image 0, image 3 and image 6 since images 1 and 3 are based on image 0; images 2, 4 and 6 are based on image 3; and image 5 is based on image 6.

Hold count information dictates how many frames an image must be held before it is displayed. This information is necessary to ensure that the images are displayed in the proper sequence. For example, the key and hold count information for the above sequence is as follows:

| Key Frames | K | | K | | | K | |
|---|---|---|---|---|---|---|---|
| Decode Order | 0 | 1 | 3 | 2 | 4 | 6 | 5 |
| Hold Count | 0 | 0 | 1 | 0 | 0 | 1 | 0 |

The above table demonstrates that image 0 will be decoded, stored in the key buffer and also displayed as the first image in the sequence (hold count is 0). Next image 1 will be decoded, based upon image 0 which is stored in the key buffer, and image 1 will be displayed (again hold count is 0). Next, image 3 will be decoded based upon image 0 then stored in the key buffer as a key image (overwriting the previous key image, image 0, which was previously stored). However, the 1 in the hold information indicates that image 3 will not be displayed, but will be held in the key buffer for one frame period. Next image 2 will be decoded, based upon image 3 which is stored in the key buffer, and image 2 will be displayed. Next image 3 will be displayed, having been held for one frame period. Next frame 4 is decoded based upon frame 3, which is still stored in the key buffer, and displayed. Next image 6 is decoded, based upon image 3 which is still in the key buffer. Since image 6 is a key image, it will be stored in the key buffer. Further, since the hold information indicates that image 6 is to be held for one frame period, it will not be displayed immediately. Next, image 5 is decoded based upon image 6 which is stored in the key buffer, and displayed. Finally, image 6, which has been held in the key buffer for one frame period, will then be displayed. As a result, the images are decoded in an out of sequence order but are displayed in the proper sequence.

The alternate preferred embodiment of the method of the present invention, used for encoding and decoding images in out of sequence order, and displaying them in the proper sequence, is depicted in FIGS. 3 and 4. Referring now to FIGS. 3 and 6, the method, generally designated 300, of encoding a sequence of images in a predetermined, out of order sequence comprises the step of providing a sequence of images 302 to a sequencer 304. The desired out of sequence order is provided by means of a compression order and key signals 306 to the sequencer 304.

The sequencer 304 selects the target image 308 based upon the compression order supplied by the compression order and key signals from 306. In the example set forth above, the sequence of images comprising mages 0, 1, 2, 3, 4, 5, 6 will be encoded in the out-of-order sequence 0, 1, 3, 2, 4, 6, and 5, with the first image (image 0) being a key image. Therefore, the compression order and key signals from 306 will instruct the sequencer 304 to select image 0 as the first key image. The first key image and the images preceding the first key image are processed as will be subsequently described in connection with FIG. 6.

Also in this example, every third image after the first image (image 3, image 6, image 9, etc.) is compressed one frame early and is made a key image. Accordingly, to display these images in proper order, the key images in this example must be held for one frame time before display. This information is provided to the decoder by the sequencer 304 in the form of key and hold signals. The key signal tells the decoder which images are key images; and the hold signal tells the decoder how many frame times each key image is to be held before it is released to the display buffer. Accordingly, in this example, the key signal will tell the decoder that image 0 and every third image thereafter in the sequence will be a key image; and that every third image beginning with image 3 will held for one frame period before being sent to the display buffer for subsequent display In accordance with the above example, every key frame is used to predict the previous and next frame, as well as the next key frame. It should be noted that the encoding sequence set forth above is exemplary only for purposes of this detailed description; and other sequences are to be considered within the scope and contemplation of the present invention. In the preferred embodiment, key frames are encoded at full resolution as well as at least one lower level of resolution. Accordingly, the best frames (that is the fully encoded key frames) are used for prediction. Consequently, only by reordering, can two of those three frames be made adjacent. It should be noted that reordering is only done when it makes sense. Some cases where it does not make sense are, for example, when the frame to be reordered begins a new scene. It does not make sense for the first frame of a new scene to predict the last frame of the previous scene. Another case where reordering does not make sense is where the frame to be reordered is very different from the others. However it is encoded, it should not be made the basis of three other frames. Since it will not be a key image, there is no point in reordering.

FIG. 3 depicts the method of processing the images which follow the first key image in the sequence of images. If the target image is a key image, as determined in step 310, it is delayed (step 312) by storing the target image in a memory device. The stored key image becomes the previous key image 314. Motion analysis 316 is performed utilizing the target image 308 and previous key image 314 in order to produce displacement vectors as previously described with respect to motion analysis 108 of FIG. 1. The displacement vectors are encoded, 317, by the binary tree technique as previously described, for subsequent use by the decoder in decoding the compressed video signal If the target image is not a key image, it will not be delayed 312 thereby becoming a previous image 314. Instead, motion analysis 316 will be performed using the same previous key image 314 as before. When the next succeeding key image becomes the target image 308, it will then be delayed 312 and become the new previous key image 314, replacing the old previous key image. This new previous key image will be used to perform motion analysis until the next succeeding previous key image comes along.

Motion compensation 318 is performed by applying the displacement vectors to a previous reconstructed image 320 to form a predicted image 322 as previously described with respect to motion compensation 110, previous reconstructed image 112 and predicted image !14 of FIG. 1. The pixel values of the predicted image 322 are subtracted from corresponding pixel values in the target image 308 to form an error image 324. At least one level of resolution of the error image 324 is selected and encoded by a pyramid encoder 326. The pyramid encoder 326 is capable of selecting and encoding the full resolution level only; the full resolution level and at least one lower level of resolution; or at least one level of resolution lower than the full resolution level but not the full resolution level. Each selected level of resolution is encoded as previously described in connection with the pyramid encoder 118 of FIG. 1. The encoded error image is subsequently used by the decoder in decoding the compressed digital video signal as will be subsequently described.

If the encoded error image is a key image, as determined in step 328, it is decoded by a pyramid decoder 330 to form a reconstructed error image 332 as described in the parent patent application Ser. No. 07/657,708. The pixel values of the reconstructed error image 332 are added to the corresponding pixel values of the predicted image 322 to form reconstructed key image 334. After a delay 336 of one frame period, the reconstructed key image 334 becomes the previous reconstructed key image 320. In the preferred embodiment this delay is accomplished by storing the reconstructed key image 334 in a second memory device for one frame period.

Referring now to FIG. 6, there is depicted the method of processing those images which occur in the sequence of images up to and including the first key image. The sequencer 304 selects each of these images as a target image 308 which encode by the pyramid encoder 326 as previously described in the detailed description in connection with FIG. 3. If the target image 308 selected by the sequencer 304 is not the first key image, this process is repeated. If the target image 308 selected by the sequencer 304 is the first key image, it is decoded by the pyramid decoder 330, as previously described in connection with FIG. 3, to form a reconstructed key image 334 which is then stored in the second memory device to become the previous reconstructed key image 320. Since the target image 308 is the first key image, it is stored in the first memory device thereby becoming the previous key image 314. Thereafter processing of the images subsequent to the first key image is preformed as previous described.

Referring now to FIG. 4, there is shown a block diagram of a preferred embodiment of a method, generally designated 400 of decoding the out of order sequence of images and presenting them for display in the proper sequence. In accordance with the method 400, each selected, encoded resolution level of the encoded error image is decoded by a pyramid decoder 402 as described in parent application Ser. No. 07/657,708, to form a reconstructed error image 404. The encoded displacement vectors are decoded using the binary tree technique described in the parent application. Motion compensation 406 is performed by applying the decoded displacement vectors to a previous reconstructed key image 408 to form a predicted image 410. In the preferred embodiment, the predicted image 410 is formed in the same manner as previously described for forming the predicted image 322 during encoding.

The pixel values of the predicted image 410 are added to the corresponding pixel values of the reconstructed error image 404 to form a reconstructed image 412. The reconstructed image 412 is maintained in a hold buffer 414 for the number of frame periods as indicated by the hold count. If the hold count is 0, the reconstructed image 412 is not held in the hold buffer 414 but is immediately sent to a display buffer (not shown) for subsequent display. If the hold count is 1, the reconstructed image 412 is held in the hold buffer 414 for one frame period then sent to the display buffer for subsequent display. If the reconstructed image is a key image, as determined at 416, it is delayed (step 418) by storing the reconstructed key image in a memory device. The stored reconstructed key image becomes the previous reconstructed key image 408. If the reconstructed image is not a key image, it will not be delayed 418 and will not become a previous reconstructed key image 408. Instead, motion compensation 406 will be performed using the same previous reconstructed key image 408 as before. When the next reconstructed key image is determined 416, it will then be delayed 418 and become the new previous reconstructed key image 408, replacing the old previous reconstructed key image. This new previous reconstructed key image will be used to perform motion compensation until the next succeeding reconstructed key image comes along.

As seen from the foregoing description, use of the present invention enables effective compression and decompression of a full motion video signal while enhancing the quality of al of the images in the displayed image sequences.

It will be understood that various modifications alternate constructions and equivalents may be employed without departing from the true spirit and scope of the invention. Therefore, the above description and illustration should not be construed as limiting the scope of the invention, which is defined by the appended claims.

I claim:

1. A method of encoding a sequence of frames of a digital motion video signal, said sequence of frames having an initial frame and at least one subsequent frame, said method comprising the steps of:
   a- selecting the initial frame of said sequence of frames of said digital motion video signal as a first target image for processing;
   b- resolving said first target image into at least one lower level of resolution;
   c- selecting at least one lower level of resolution of said first target image for encoding;
   d- forming an encoded target image by encoding said at least one selected level of resolution;
   e- forming a previous target image by storing said first target image in first storage means;
   f- forming a previous reconstructed image by storing a reconstructed image in second storage means;
   g- selecting a subsequent frame from said sequence of frames as a target image;
   h- providing at least one displacement vector representing the magnitude and direction of the displacement between at least one region in the target image being processed and a corresponding region in said previous target image;
   i- applying said at least one displacement vector to a corresponding region in said previous reconstructed image to form a predicted image;
   j- encoding said at least one displacement vector;
   k- subtracting pixel values in the predicted image from corresponding pixel values in said target image to form an error image;
   l- resolving said error image into at least one lower level of resolution;
   m- selecting at least one lower level of resolution of said error image for encoding;
   n- forming an encoded error image by encoding said at least one selected level of resolution;
   o- forming a new previous target image by storing said target image being processed in said first storage means in place of the target image stored in step e;
   p- forming a new previous reconstructed image by storing a new reconstructed image in said second storage means in place of the reconstructed image stored in step f; and
   q- repeating steps g through p for subsequent images in said sequence of frames.

2. The method in accordance with claim 1 wherein the reconstructed image of step f is formed by decoding said at least one selected level of resolution of said encoded target image.

3. The method in accordance with claim 2 wherein the step of forming a new previous reconstructed image comprises the steps of:
   a- forming a reconstructed error image by decoding said at least one selected level of resolution of said encoded error image;
   b- adding pixel values in said reconstructed error image to corresponding pixel values in said predicted image to form the new reconstructed image; and
   c- forming said new previous reconstructed image by storing said new reconstructed image in second storage means for a predetermined period of time.

4. The method in accordance with claim 3 wherein the step of providing at least one displacement vector comprises the steps of:
   a- resolving said target image and said previous target image into at least one level of resolution lower than the full resolution level;
   b- dividing said at least one level of resolution of said target image into at least one region;
   c- obtaining a displacement vector representative of the displacement of said at least one region of said lowest level of resolution of said target image with respect to a corresponding region of said lowest level of resolution of said previous target image;
   d- using the displacement vector determined with respect to the lowest level of resolution as a starting point, determining the displacement vectors for the regions of the next higher resolution level; and e- determining the displacement vectors for the regions of each remaining level of resolution, including the full resolution level, using displacement vectors determined with respect to the next lower level of resolution as starting points.

5. The method in accordance with claim 4 wherein said predetermined period of time is substantially equal to one frame period.

6. The method in accordance with claim 1 wherein steps c and m comprise selecting the full resolution level and at least one lower level of resolution.

7. The method in accordance with claim 6 wherein steps d and n comprise encoding the full resolution level and at least one lower level of resolution.

8. The method in accordance with claim 1 wherein steps c and m comprise selecting at least one level of resolution lower than the full resolution level but not the full resolution level.

9. The method in accordance with claim 8 wherein steps d and n comprise encoding at least one level of resolution lower than the full resolution level but not the full resolution level.

10. The method in accordance with claim 1 wherein steps d and n encode using a vector quantized representation of pixel values.

11. The method in accordance with claim 1 wherein steps d and n each include the steps of:
   i- quantizing the pixel values within said at least one selected level of resolution;
   ii- dividing the quantized pixel values into null and non-null blocks of pixels; and
   iii- using binary tree with off-center splits to encode null blocks with a minimal number of splits.

12. The method in accordance with claim 1 wherein steps j includes the stpes of:
   i- providing a quantized value for said at least one displacement vector;
   ii- dividing said at least one quantized displacement vector into homogeneous regions;
   iii- using binary tree with off-center splits to encode the homogeneous regions with a minimal number of splits.

13. A method of decoding an encoded digital motion video signal, said encoded digital motion video signal comprising a sequence of encoded error images and associated encoded displacement vectors, each encoded error image comprising at least one encoded level of resolution lower than the full resolution level, said method comprising the steps of:
   a- forming a reconstructed error image by decoding said at least one encoded level of resolution of each of said encoded error images in said sequence;
   b- decoding said displacement vectors;
   c- applying each decoded displacement vector to a corresponding region in a previous reconstructed image to form a predicted image; and
   d- forming a reconstructed image by adding pixel values in said reconstructed error image to corresponding pixel values in said predicted image.

14. The method in accordance with claim 13 wherein said previous reconstructed image is formed by storing said reconstructed image in second storage means for a predetermined period of time.

15. A method of encoding a digital motion video signal comprising the steps of:

a- selecting a frame of a sequence of frames of said digital motion video signal as a target image for processing;

b- selecting at least one level of resolution of said target image for encoding;

c- forming an encoded target image by encoding said at least one selected level of resolution;

d- determining if said target image is a key image and if:
   (i) said target image is not a key image, selecting a subsequent frame of said sequence of frames as a target image and repeating steps a through d until a key image is determined;
   (ii) said target image is a key image, forming a previous key image by storing said key image in first storage means and forming a previous reconstructed key image by storing a reconstructed key image in second storage means;

e- selecting a subsequent frame from said sequence of frames as a target image;

f- providing at least one displacement vector representing the magnitude and direction of the displacement between at least one region in the target image being processed and a corresponding region in said previous key image;

g- applying said at least one displacement vector to a corresponding region in said previous reconstructed key image to form a predicted image;

h- encoding said displacement vector;

i- subtracting pixel values in the predicted image from corresponding pixel values in said target image to form an error image;

j- selecting at least one level of resolution of said error image for encoding;

k- forming an encoded target image by encoding said at least one selected level of resolution;

l- determining if said target image is a key image and if:
   (i) said target image is not a key image, repeating steps e through l;
   (ii) said target image is a key image, forming a new previous key image by storing said key image in said first storage means in place of the key image stored in step d(ii) and forming a new previous reconstructed key image by storing said reconstructed key image in said second storage means in place of the reconstructed key image stored in step d)ii), then repeating steps e through l; and wherein at least one previous key image is used during succeeding iterations of step (f) to provide displacement vectors for two or more processed target images.

16. The method in accordance with claim 15 wherein the step of forming a previous reconstructed key image comprises the steps of:
   a- forming a reconstructed key error image by decoding an encoded key error image;
   b- adding pixel values in said reconstructed key error image to pixel values in said predicted image to form a reconstructed key image; and
   c- forming said previous reconstructed key image by storing said reconstructed key image for a predetermined period of time.

17. The method in accordance with claim 16 wherein the step of providing at least one displacement vector comprises the steps of:

a- resolving said target image and said previous key image each into at least one level resolution lower than the full resolution level;
b- dividing said at least one level of resolution into at least one region;
c- obtaining a displacement vector representative of the displacement of said at least one region of said lowest level resolution of said target image with respect to a corresponding region of said lowest level of resolution of said previous key image;
d- using the displacement vector determined with respect to the lowest level of resolution as a starting point, determining displacement vectors for the regions of the next higher resolution level; and
e- determining the displacement vectors for the region of each remaining level of resolution, including the full resolution level, using displacement vectors determined with respect to the next lower level of resolution as starting points.

18. The method in accordance with claim 15 wherein steps b and j each comprises selecting the full resolution level only.

19. The method in accordance with claim 15 wherein steps b and j each comprises selecting the full resolution level and at least one lower level of resolution.

20. The method in accordance with claim 15 wherein steps b and j each comprises selecting at least one level of resolution lower than the full resolution level but not the full resolution level.

21. The method of claim 15 wherein steps c and k each include the steps of:
    i- quantizing the pixel values within said at least one selected level of resolution;
    ii- dividing the quantized pixel values into null and non-null blocks of pixels; and
    iii- using binary tree with off-center splits to encode null blocks with a minimal number of splits.

22. The method in accordance with claim 15 wherein step h comprises the steps of:
    i- providing a quantized value for said at least one displacement vector;
    ii- dividing the quantized displacement vectors into homogenous regions; and
    iii- using binary tree with off-center splits to encode the homogeneous regions with a minimal number of splits.

23. A method of decoding an encoded digital motion video signal, said encoded digital motion video signal comprising an out of display order sequence of encoded error images, and associated encoded displacement vectors, each encoded error image comprising at least one encoded level of resolution; said method comprising the steps:
    a- forming a reconstructed error image by decoding said at least one encoded level of resolution of each of said encoded error images in said out of order sequence;
    b- decoding said displacement vectors;
    c- applying each decoded displacement vector to a corresponding region in a previous reconstructed image to form a predicted image;
    d- forming a reconstructed image by adding pixel values in said reconstructed error image to corresponding pixel values in said predicted image; and
    e- storing said reconstructed image in first storage means for a predetermined time.

24. A method of forming an encoded signal from a sequence of frames of a digital motion video signal, said encoded signal comprising an out of display order sequence of encoded image frames, comprising the steps of:
    a- selecting a frame of said sequence of frames of said digital motion video signal as a target image for processing;
    b- encoding at least one level of resolution of said target image;
    c- forming a previous target image by storing said target image in first storage means and forming a previous reconstructed image by forming a previous reconstructed image by storing a reconstructed image in second storage means;
    d- selecting another frame from said sequence of frames of said digital motion video signal as a target image for processing;
    e- providing at least one displacement vector representing the magnitude and direction of the displacement between at least one region in the target image being processed and a corresponding region in said previous image;
    f- applying said at least one displacement vector to a corresponding region in said previous reconstructed image to form a predicted image;
    g- encoding said at least one displacement vector;
    h- subtracting pixel values in the predicted image from corresponding pixel values in said target image to form an error image;
    i- encoding at least one level of resolution of said error image; and
    j- forming a new previous target image by storing said target image in said first storage means in place of the target image stored in step c and forming a new previous reconstructed image in said second storage means in place of the reconstructed image stored in step c, then repeating steps d through j.

* * * * *

UNITED STATES PATENT AND TRADEMARK OFFICE
CERTIFICATE OF CORRECTION

| | | |
|---|---|---|
| PATENT NO. | : 5,134,478 | |
| APPLICATION NO. | : 07/704945 | |
| DATED | : October 5, 2004 | |
| INVENTOR(S) | : Riesenman et al. | |

It is certified that error appears in the above-identified patent and that said Letters Patent is hereby corrected as shown below:

In column 13, at line 2, delete the first occurrence of "the".
In column 13, at line 3, delete the second occurrence of "the".
In column 13, at line 27, delete "encode" and insert --comprise encoding--.
In column 13, at line 38, delete "stpes of" and insert --steps of--.
In column 14, at line 49, delete "d)ii)" and insert --d(ii)--.
In column 15, at line 2, insert --of-- after "level".
In column 15, at line 14, delete "the".
In column 15, at line 16 delete the second occurrence of "the".

Signed and Sealed this

Thirty-first Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 5,134,478
APPLICATION NO. : 07/704945
DATED : July 28, 1992
INVENTOR(S) : Stuart J. Golin It is certified that error appears in the above-identified patent and that said Letters Patent is hereby corrected as shown below:

In column 13, at line 2, delete the first occurrence of "the".
In column 13, at line 3, delete the second occurrence of "the".
In column 13, at line 27, delete "encode" and insert --comprise encoding--.
In column 13, at line 38, delete "stpes of" and insert --steps of--.
In column 14, at line 49, delete "d)ii)" and insert --d(ii)--.
In column 15, at line 2, insert --of-- after "level".
In column 15, at line 14, delete "the".
In column 15, at line 16 delete the second occurrence of "the".

This certificate supersedes Certificate of Correction issued July 31, 2007.

Signed and Sealed this

Fourth Day of September, 2007

JON W. DUDAS
*Director of the United States Patent and Trademark Office*